(12) United States Patent
Chou

(10) Patent No.: US 7,864,332 B2
(45) Date of Patent: Jan. 4, 2011

(54) DIFFERENTIAL-PHASE INTERFEROMETRIC SYSTEM

(75) Inventor: Chien Chou, 5F, No. 37-3, Chuan-Yuan Rd., Pei-Tou Dist., Taipei City (TW)

(73) Assignee: Chien Chou, Peitou, Taipei (TW)

( * ) Notice: Subject to any disclaimer, the term of this patent is extended or adjusted under 35 U.S.C. 154(b) by 393 days.

(21) Appl. No.: 12/157,777

(22) Filed: Jun. 12, 2008

(65) Prior Publication Data
US 2008/0309946 A1 Dec. 18, 2008

Related U.S. Application Data

(60) Provisional application No. 60/934,475, filed on Jun. 14, 2007.

(51) Int. Cl.
*G01B 9/02* (2006.01)
(52) U.S. Cl. ................................. 356/487
(58) Field of Classification Search ............. 356/484, 356/487, 491
See application file for complete search history.

(56) References Cited
U.S. PATENT DOCUMENTS

| | | | | |
|---|---|---|---|---|
| 5,037,202 A | * | 8/1991 | Batchelder et al. | 356/336 |
| 5,543,914 A | * | 8/1996 | Henshaw et al. | 356/487 |
| 6,934,035 B2 | * | 8/2005 | Yang et al. | 356/485 |
| 7,006,562 B2 | * | 2/2006 | Chou | 375/226 |
| 7,339,682 B2 | * | 3/2008 | Aiyer et al. | 356/504 |
| 7,365,858 B2 | * | 4/2008 | Fang-Yen et al. | 356/489 |

\* cited by examiner

*Primary Examiner*—Gregory J Toatley
*Assistant Examiner*—Scott M Richey

(57) ABSTRACT

A differential-phase interferometric system includes a polarized heterodyne interferometer for generating reference and signal beam that travel along reference and signal channels, respectively. The signal beam is directed to a specimen and contains measured information of the specimen. The interferometer further generates a first electrical signal output corresponding to first linear polarized waves of the reference and signal beams, and a second electrical signal output corresponding to second linear polarized waves of the reference and signal beams. A differential amplifier receives the first and second electrical signal outputs, and generates a differential signal output therefrom. A data acquisition unit is used to measure amplitudes of the first and second electrical signal outputs and the differential signal output. A computing unit computes the amplitudes measured by the data acquisition unit to determine a phase difference between the electrical signal outputs, which corresponds to the measured information of the specimen.

13 Claims, 3 Drawing Sheets

DIFFERENTIAL-PHASE INTERFEROMETRIC SYSTEM

CROSS-REFERENCE TO RELATED APPLICATION

This application claims priority of U.S. Provisional Patent Application Ser. No. 60/934,475, filed on Jun. 14, 2007.

BACKGROUND OF THE INVENTION

1. Field of the Invention

The invention relates to an interferometric system that involves differential-phase decoding and that is suitable for applications requiring high speed and high detection sensitivity.

2. Description of the Related Art

U.S. Pat. No. 7,006,562B2 discloses a phase demodulator for measuring a phase difference between a phase-modulated test signal and a phase-modulated reference signal having fixed carrier frequencies. The phase demodulator includes an amplitude control device for adjusting amplitudes of the test and reference signals. A differential amplifier receives amplitude-adjusted test and reference signals from the amplitude control device, obtains an intensity difference between the amplitude-adjusted test and reference signals, and amplifies the intensity difference to generate an amplitude-modulated output. An amplitude demodulator demodulates the amplitude-modulated output to obtain an output that is related to the phase difference.

The aforementioned patent further discloses a phase difference detector for use with a polarized optical interferometer that generates two mutually orthogonal polarized optical signals, at least one of which is incident upon a test object. The optical signals have equal intensities and carrier frequencies and are processed to obtain two electrical signals that are a function of a frequency, a time, and a phase difference between the two mutually orthogonal polarized optical signals. The phase difference detector comprises a differential amplifier that receives the electrical signals, that obtains an intensity difference therebetween, and that amplifies the intensity difference to generate an amplitude-modulated output that is a function of a phase difference between the electrical signals. The phase difference detector further comprises a signal processing device including an amplitude demodulator for demodulating the amplitude-modulated output to obtain an output that is related to the phase difference.

In the aforementioned patent, the output that is related to the phase difference can be obtained solely from the amplitude-modulated output due to the adjustment of the amplitudes of the test and reference signals performed by the amplitude control device. However, the need for amplitude-adjustment processing by the amplitude control device limits potential applications of the phase demodulator and the phase difference detector disclosed in the aforementioned U.S. patent.

SUMMARY OF THE INVENTION

Therefore, an object of the present invention is to provide an interferometric system that involves differential-phase decoding and that is suitable for applications requiring high response speed and high detection sensitivity.

According to this invention, there is provided a differential-phase interferometric system for measuring a specimen. The differential-phase interferometric system comprises:

a polarized heterodyne interferometer for generating a reference beam that travels along a reference channel and that includes two mutually orthogonal first and second linear polarized waves, and a signal beam that travels along a signal channel and that includes two mutually orthogonal first and second linear polarized waves, the reference and signal beams having a beat frequency therebetween, the signal beam being directed to the specimen and containing measured information of the specimen, the polarized heterodyne interferometer further generating a first optical heterodyne electrical signal output corresponding to the first linear polarized waves of the reference and signal beams, and a second optical heterodyne electrical signal output corresponding to the second linear polarized waves of the reference and signal beams;

a differential amplifier receiving the first and second optical heterodyne electrical signal outputs from the polarized heterodyne interferometer, and generating a differential signal output therefrom;

a data acquisition unit receiving the first and second optical heterodyne electrical signal outputs from the polarized heterodyne interferometer and the differential signal output from the differential amplifier, and measuring amplitudes of the first and second optical heterodyne electrical signal outputs and the differential signal output; and a computing unit for computing the amplitudes measured by the data acquisition unit to determine at least one parameter corresponding to the measured information of the specimen.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
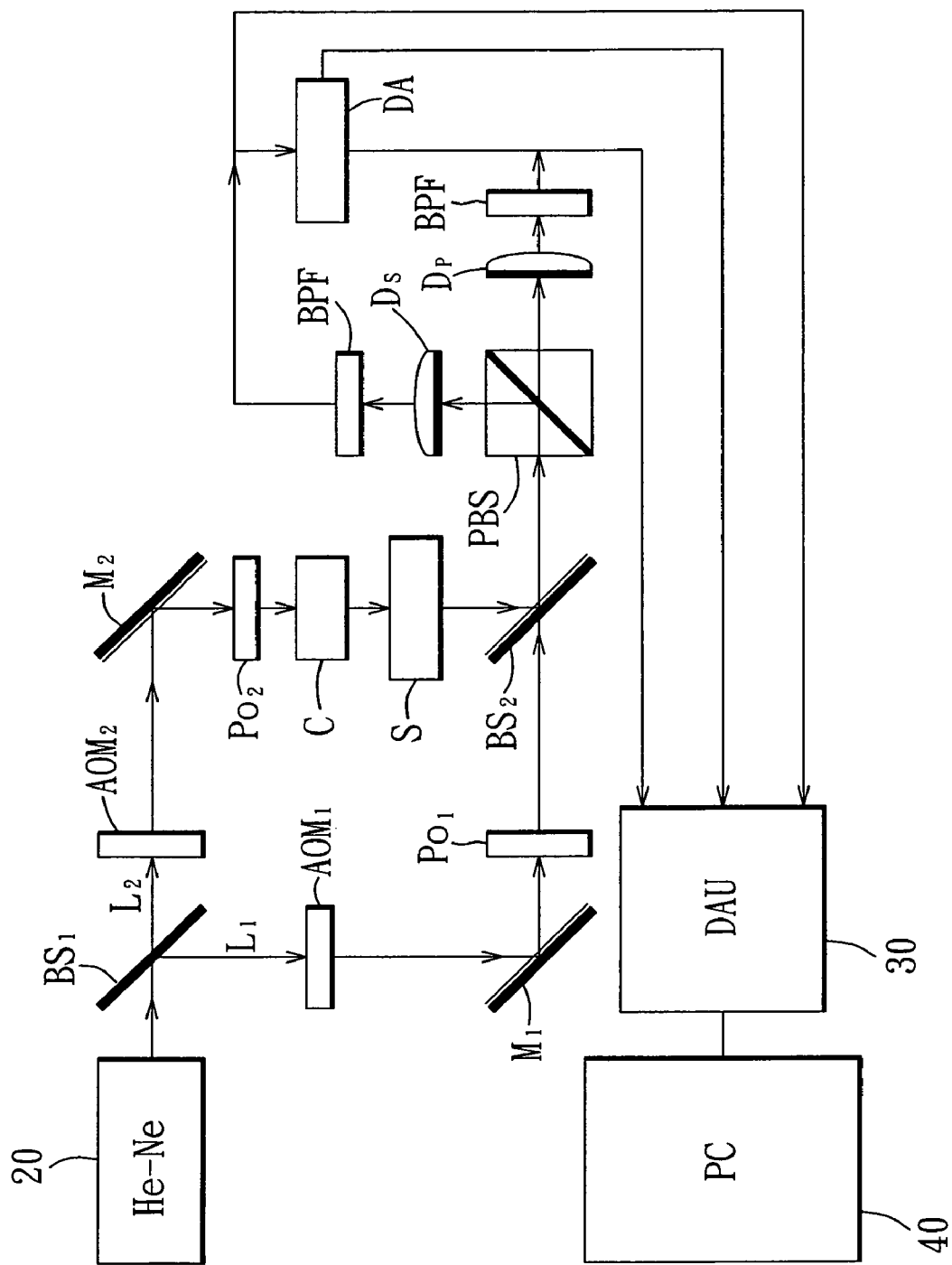
FIG. 1 is a block diagram of a first preferred embodiment of a differential-phase interferometric system according to the present invention.

Referring to FIG. 1, the first preferred embodiment of a differential-phase interferometric system according to the present invention is suitable for measuring optical characteristics of a specimen (S), such as a parallel-aligned liquid crystal device (PALCD) In this embodiment, the interferometric system includes a polarized heterodyne interferometer, a differential amplifier (DA), a data acquisition unit (DAU) 30, and a computing unit (PC) 40, such as a personal computer. The polarized heterodyne interferometer includes a coherent light source 20, first and second beam splitters ($BS_1$, $BS_2$), first and second frequency modulators ($AOM_1$, $AOM_2$), first and second mirrors ($M_1$, $M_2$), first and second polarizers ($PO_1$, $PO_2$), a compensator (C), a polarization beam splitter (PBS), first and second photo detectors ($D_p$, $D_s$), and first and second bandpass filters (BPF).

During operation, polarized light from the coherent light source 20, such as a single-frequency linear-polarized stabilized He—Ne laser, is separated by the first beam splitter ($BS_1$) into a reference beam ($L_1$) that travels along a reference channel and a signal beam ($L_2$) that travels along a signal channel. The reference and signal beams ($L_1$, $L_2$) are processed by the first and second frequency modulators ($AOM_1$, $AOM_2$), respectively. In this embodiment, each of the first and second frequency modulators ($AOM_1$, $AOM_2$) is an acousto-optic modulator. Each of the first and second frequency modulators ($AOM_1$, $AOM_2$) is driven such that the frequency of the reference beam ($L_1$) is adjusted to $\omega_1$ and such that the frequency of the signal beam ($L_2$) is adjusted to $\omega_2$. In other words, a beat frequency $\Delta\omega$ between the reference beam ($L_1$) and the signal beam ($L_2$) is formed after processing of the reference and signal beams ($L_1$, $L_2$) by the first and second frequency modulators ($AOM_1$, $AOM_2$). It is noted that an electro-optic device can be used as the frequency modulator instead of the acousto-optic modulator in other embodiments of the invention.

The reference beam ($L_1$) is further directed to the first polarizer ($Po_1$) by the first mirror ($M_1$). On the other hand, the signal beam ($L_2$) is further directed to the second polarizer ($Po_2$) by the second mirror ($M_2$). By virtue of the first and second polarizers ($Po_1$, $Po_2$), which are adjusted on the polarization direction at 45 degrees to x-axis in the interferometer, mutually orthogonal linear polarized first and second waves (i.e., $P_1$ and $S_1$ waves) are generated in the reference channel, and mutually orthogonal linear polarized first and second waves (i.e., $P_2$ and $S_2$ waves) are generated in the signal channel under the conditions $A_{p1}=A_{S1}$ and $A_{p2}=A_{s2}$ where $A_{p1}, A_{s1}, A_{p2}$ and $A_{s2}$ are the amplitudes of the $P_1$, $S_1$, $P_2$ and $S_2$ waves, respectively. The $P_1$ and $S_1$ waves of the reference beam are provided to the second beam splitter ($BS_2$). The $P_2$ and $S_2$ waves of the signal beam reach the second beam splitter ($BS_2$) after passing through the compensator (C) and the specimen (S), and are combined with the $P_1$ and $S_1$ waves of the reference beam. The output of the second beam splitter ($BS_2$) is received by the polarization beam splitter (PBS) and is separated into mutually orthogonal linear polarized first (i.e., P-wave, $P_1+P_2$) and second (i.e., S-wave, $S_1+S_2$) optical signals. The compensator (C) is used to provide compensation for DC phase bias attributed to the optical components of the polarized heterodyne interferometer. The P-wave and S-wave optical signals are detected by the first and second photo detectors ($D_p$, $D_s$), respectively, for conversion into corresponding first and second optical heterodyne electrical signal outputs that can be expressed by $$I_P(\Delta\omega t)=A_{p1}^2+A_{p2}^2+2A_{p1}A_{p2}\cos(\Delta\omega t+\Delta\phi_P),\qquad(1)$$

$$I_S(\Delta\omega t)=A_{s1}^2+A_{s2}^2+2A_{s1}A_{s2}\cos(\Delta\omega t+\Delta\phi_s),\qquad(2)$$

where $\Delta\phi_P$ is the phase retardation between the $P_1$ and $P_2$ waves, and $\Delta\phi_S$ is the phase retardation between the $S_1$ and $S_2$ waves.

The optical heterodyne electrical signal outputs from the first and second photo detectors ($D_p$, $D_s$) are provided to the first and second band pass filters (BPF), respectively, for processing. The center frequency of each of the first and second bandpass filters (BPF) is $\Delta\omega=\omega_1-\omega_2$, i.e., the beat frequency of the first and second optical heterodyne electrical signal outputs. If only AC terms are considered, Equations (1) and (2) become $$I_P(\Delta\omega t)=2A_{p1}A_{p2}\cos(\Delta\omega t+\Delta\phi_P),\qquad(3)$$

$$I_S(\Delta\omega t)=2A_{s1}A_{s2}\cos(\Delta\omega t+\Delta\phi_S),\qquad(4)$$

By setting $\alpha=\Delta\omega t+(\Delta\phi_S+\Delta\phi_P)/2$, $\beta=(\Delta\phi_S-\Delta\phi_P)/2$, $\kappa_P=2A_{p1}A_{p2}$, and $\kappa_S=2A_{s1}A_{s2}$ in Equations (3) and (4), then $$I_P(\Delta\omega t)=\kappa_P\cos(\alpha-\beta),\qquad(5)$$

$$I_S(\Delta\omega t)=\kappa_S\cos(\alpha+\beta),\qquad(6)$$

The differential output signal $I_{diff}(\Delta\omega t)$ generated by the differential amplifier (DA), which receives the filtered first and second optical heterodyne electrical signal outputs, can be expressed by $$\begin{aligned}I_{diff}(\Delta\omega t) &= I_S(\Delta\omega t)-I_P(\Delta\omega t) \qquad(7)\\ &=(\kappa_S-\kappa_P)\cos\alpha\cos\beta-(\kappa_S+\kappa_P)\sin\alpha\sin\beta\\ &=\cos\gamma'\cos\alpha-\sin\gamma'\sin\alpha\\ &=\sqrt{\kappa_S^2+\kappa_P^2-2\kappa_S\kappa_P\cos(\Delta\phi_S-\Delta\phi_P)}\cos(\alpha+\gamma'')\\ &=\kappa_{diff}\cos(\alpha+\gamma''),\end{aligned}$$

where $\kappa_{diff}=\sqrt{\kappa_S^2+\kappa_P^2-2\kappa_S\kappa_P\cos(\Delta\phi_S-\Delta\phi_P)}$ and $\gamma''$ is a phase angle dependent on $\kappa_P$ and $\kappa_S$. $\kappa_{diff}$ is the amplitude of $I_{diff}(\Delta\omega t)$ which belongs to an amplitude-modulated (AM) signal of the beat frequency equal to $\Delta\omega$.

The DAU 30 uses conventional envelope detection techniques to measure amplitudes of the filtered first and second optical heterodyne electrical signal outputs, and the differential signal output from the differential amplifier (DA). In this embodiment, the DAU 30 includes three independent amplitude demodulators, such as digital voltmeters (not shown), to record the amplitudes of the filtered first and second optical heterodyne electrical signal outputs and the differential signal output at the same time. The computing unit (PC) 40 computes the amplitudes measured by the DAU 30 according to the following Equations (8) and (9) to determine the phase difference between the $S_2$ and $P_2$ waves, $\delta=\Delta\phi_S-\Delta\phi_P=\phi_{P2}-\phi_{S2}$, and $\Psi=\tan^{-1}(A'_{P2}/A'_{S2})$ in real-time in terms of $\kappa_P$, $\kappa_S$, and $\kappa_{diff}$.

$$\delta=\cos^{-1}[(\kappa_S^2+\kappa_P^2-\kappa_{diff}^2)/2\kappa_S\kappa_P]\qquad(8)$$

$$\Psi=\tan^{-1}(\kappa_P/\kappa_S)\qquad(9)$$

Therefore, the ellipsometric parameters, $\delta$ and $\psi$, of the specimen (S) can be measured precisely in terms of $\kappa_P$, $\kappa_S$, and $\kappa_{diff}$ in real time using the differential-phase interferometric system of the first preferred embodiment.

The differential amplifier (DA), the DAU 30 and the computing unit (PC) 40 cooperate to form a differential-phase decoder suitable for measuring a phase difference between a first signal $I_1(t)=\chi_1\cos(\omega t+\phi_1)$ and a second signal $I_2(t)=\chi_2\cos(\omega t+\phi_2)$. In particular, the differential amplifier (DA) receives the first and signals, and generates a differential signal output $\Delta I(t)=I_1(t)-I_2(t)=\sqrt{\chi_1^2+\chi_2^2-2\chi_1\chi^2\cos(\phi_1-\phi_2)}\cos(\omega t+\Gamma)$ therefrom, where $\Gamma$ is a phase angle. The DAU 30 receives the first and second signals and the differential signal output from the differential amplifier (DA), and measures amplitudes of the first and second signals and the differential signal output. The computing unit (PC) 40 computes the amplitudes measured by the DAU 30 to determine the phase difference $\Delta\phi$ between the first and second signals, the phase difference $\Delta\phi$ being equal to $$\Delta\phi = \phi_1 - \phi_2 = \cos^{-1}\{|I_1|^2 + |I_2|^2 - |\Delta I|^2 / 2|I_1||I_2|\},$$

which corresponds to Equation (8) described above, and where $|I_1|=\chi_1, |I_2|=\chi_2, |\Delta I|=\sqrt{\chi_1^2+\chi_2^2-2\chi_1\chi_2\cos(\phi_1-\phi_2)}$.

Figure 2:
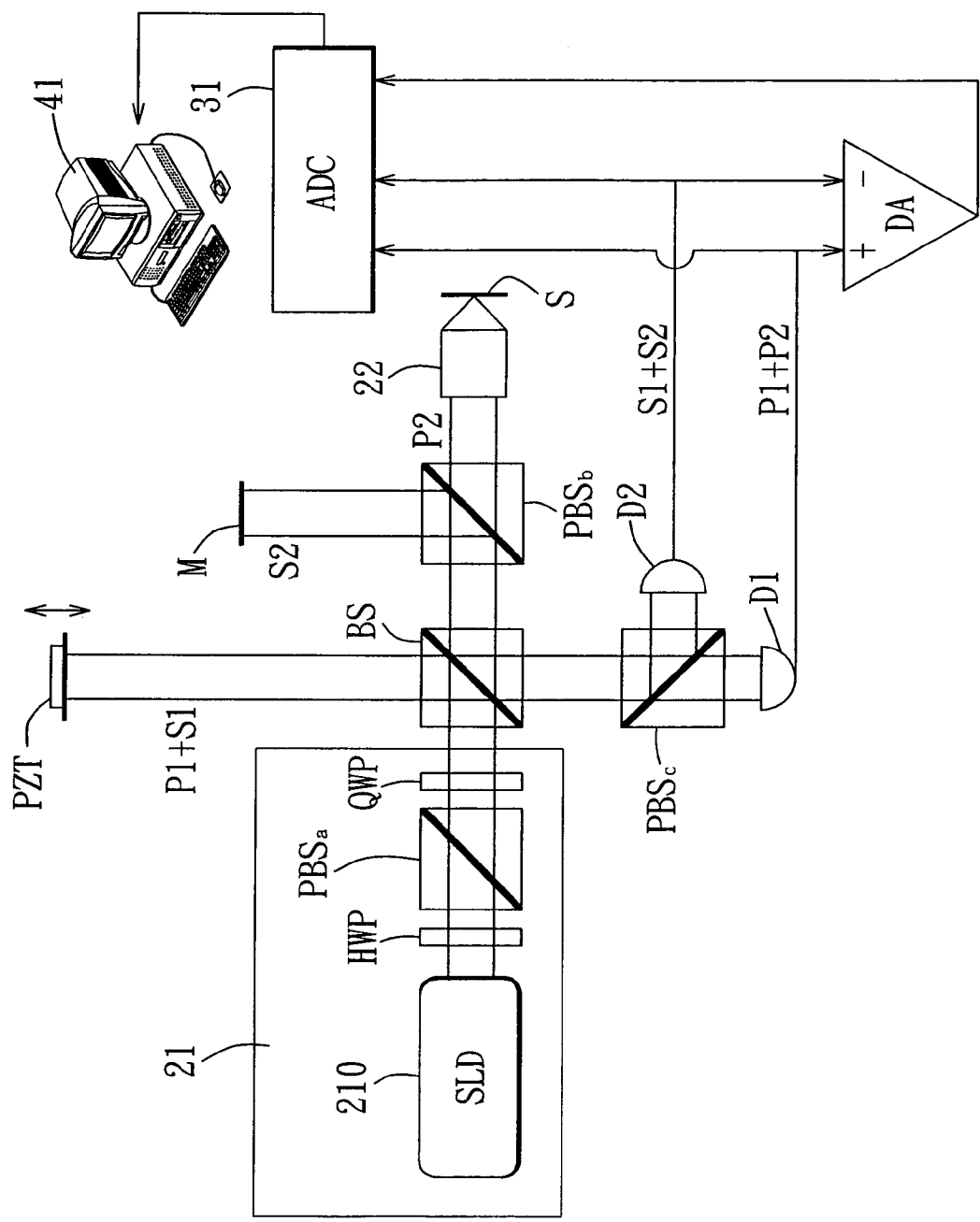
FIG. 2 is a block diagram of a second preferred embodiment of a differential-phase interferometric system according to the present invention.

Referring to FIG. 2, the second preferred embodiment of a differential-phase interferometric system according to the present invention is suitable for use with a low coherence laser source and for localized surface profile measurement. In this embodiment, the interferometric system includes a polarized heterodyne interferometer, a differential amplifier (DA), a data acquisition unit 31, and a computing unit 41, such as a personal computer. The polarized heterodyne interferometer includes a light source module 21, a beam splitter (BS), a phase-modulating mirror unit such as a piezoelectric-supported mirror (PZT), a mirror (M), an objective lens 22, first and second polarization beam splitters ($PBS_b$, $PBS_c$), and first and second photo detectors (D1, D2).

In this embodiment, the light source module 21 includes a broadband super luminescent diode (SLD) 210 employed as a low coherence light source emitting an elliptically polarized beam. The elliptically polarized beam passes in sequence through a half-wave plate (HWP), a polarization beam splitter (PBSa), and a quarter-wave plate (QWP) to result in a circularly polarized output beam. The circularly polarized output beam can be described by Jones vector as $$E = E_0 \begin{pmatrix} 1 \\ \pm i \end{pmatrix}, \tag{101}$$

where $E_0 = A_0(k)\exp[i(\omega t)]$, and $A_0(k)$ means the amplitude of electric field which is a function of wave number $k=2\pi/\lambda$, where $\lambda$ is the laser source wavelength.

In Equation (101), the electric field can be decomposed into a horizontal polarization component ($E_P = E_0[1,0]^T$) and a vertical polarization component ($E_S = E_0[0,\pm i]^T$), where the superscript T denotes transpose. If the laser beam is right-hand circularly polarized, after being split by the beam splitter (BS) into two equal-amplitude laser beams, the reference beam that travels along a reference channel and the signal beam that travels along a signal channel are $$E_1 = \frac{1}{\sqrt{2}} E_0 \begin{pmatrix} 1 \\ i \end{pmatrix}, \tag{102}$$

$$E_2 = \frac{1}{\sqrt{2}} E_0 \begin{pmatrix} 1 \\ i \end{pmatrix}, \tag{103}$$

respectively. In the reference channel, the piezoelectric-supported mirror (PZT) is modulated at a predetermined frequency for generating a Doppler frequency shift of the laser beam, and the reference beam reflected by the piezoelectric-supported mirror (PZT) is decomposed into mutually orthogonal first and second linear polarized waves (i.e., a $P_1$ wave and a $S_1$ wave) by the second polarization beam splitter (PBSc) On the other hand, the signal beam is split by the first polarization beam splitter (PBSb) into two mutually orthogonal first and second linear polarized waves (i.e., a $P_2$ wave and a $S_2$ wave). The $P_2$ wave is focused by the objective lens 22 on to the specimen (S), and is reflected by a focal plane of the specimen (S). The $S_2$ wave is reflected by the mirror (M). The $P_2$ wave and the $S_2$ wave can be expressed by $$E_{P2} = \sqrt{\frac{R_S}{2}} E_0 \begin{pmatrix} 1 \\ 0 \end{pmatrix} \exp(-i2kl_{P2}), \tag{104}$$

$$E_{S2} = \sqrt{\frac{R_M}{2}} E_0 \begin{pmatrix} 0 \\ i \end{pmatrix} \exp(-i2kl_{S2}), \tag{105}$$

where $R_S$ and $R_M$ are the reflectivity of the specimen (S) and the mirror (M), respectively. $l_{P2}$ and $l_{S2}$ are the optical path lengths of the $P_2$ and $S_2$ waves in the interferometer, respectively. The $P_1$ and $P_2$ waves and the $S_1$ and $S_2$ waves are recombined by the beam splitter (BS) and then separated by the second polarization beam splitter (PBSc), resulting in mutually orthogonal linear-polarized first and second optical signals, i.e., P-polarized and S-polarized optical signals. The first and second optical signals are detected by the first and second photo detectors (D1, D2), respectively. The electric fields of the $P_1$, $P_2$, $S_1$, and $S_2$ waves are $$E_{P1} = \frac{\sqrt{R_1}}{2} E_0 \begin{pmatrix} 1 \\ 0 \end{pmatrix} \exp(-i2kl_{P1}), \tag{106}$$

$$E_{P2} = \frac{\sqrt{R_S}}{2} E_0 \begin{pmatrix} 1 \\ 0 \end{pmatrix} \exp(-i2kl_{P2}), \tag{107}$$

$$E_{S1} = \frac{\sqrt{R_1}}{2} E_0 \begin{pmatrix} 0 \\ i \end{pmatrix} \exp(-i2kl_{S1}), \tag{108}$$

$$E_{S2} = \frac{\sqrt{R_M}}{2} E_0 \begin{pmatrix} 0 \\ i \end{pmatrix} \exp(-i2kl_{S2}), \tag{109}$$

where $R_1$ is the reflectivity of the piezoelectric-supported mirror (PZT), and $l_{P1}$ and $l_{S1}$ are the optical path lengths of the $P_1$ and $S_1$ waves in the interferometer, respectively. Thus, $$E_P = \frac{1}{2} E_0 \left[ \sqrt{R_1} \exp(-i2kl_{P1}) + \sqrt{R_S} \exp(-i2kl_{P2}) \right], \tag{110}$$

$$E_S = \frac{i}{2} E_0 \left[ \sqrt{R_1} \exp(-i2kl_{S1}) + \sqrt{R_M} \exp(-i2kl_{S2}) \right], \tag{111}$$

$$i_P = \gamma \langle E_P^2 \rangle \tag{112}$$
$$= \frac{\gamma A_0^2(k)}{4} \left[ R_1 + R_S + 2\sqrt{R_1 R_S} \cos(2k\Delta l_P) \right],$$

$$i_S = \gamma \langle E_S^2 \rangle \tag{113}$$
$$= \frac{\gamma A_0^2(k)}{4} \left[ R_1 + R_M + 2\sqrt{R_1 R_M} \cos(2k\Delta l_S) \right],$$

where $\gamma$ is the quantum efficiency of the first and second photo detectors (D1, D2), and $\Delta l_P = l_{P1} - l_{P2}$, $\Delta l_S = l_{S1} - l_{S2}$. Assume the power spectrum of the SLD 210, $A_0^2(k)$, satisfies $$A_0^2(k) = P_0 S(k), \tag{114}$$

where $P_0$ is the power of laser source and $S(k)$ is the Gaussian spectral density $$S(k) = \frac{2\sqrt{\ln 2}}{\Delta k \sqrt{\pi}} \exp\left\{-\left[\frac{(k-k_0)2\sqrt{\ln 2}}{\Delta k}\right]^2\right\}, \quad (115)$$

$k_0$ is the wave number on central wavelength, and $\Delta k$ is the spectral bandwidth (FWHM) of the laser source. The interference signal by integrating the whole spectrum is then $$\begin{aligned}
I_P &= \int_{-\infty}^{\infty} i_P \, dk \\
&= \frac{\gamma P_0}{4} \int_{-\infty}^{\infty} S(k)\left[R_1 + R_S + 2\sqrt{R_1 R_S} \cos(2k\Delta l_P)\right] dk \\
&= \frac{\gamma P_0}{4} \exp\left[-\left(\frac{2\Delta l_P \sqrt{\ln 2}}{l_\omega}\right)^2\right] \\
&\quad \left[R_1 + R_S + 2\sqrt{R_1 R_S} \cos(2k_0 \Delta l_P)\right],
\end{aligned} \quad (116)$$

$$\begin{aligned}
I_S &= \int_{-\infty}^{\infty} i_S \, dk \\
&= \frac{\gamma P_0}{4} \int_{-\infty}^{\infty} S(k)\left[R_1 + R_M + 2\sqrt{R_1 R_M} \cos(2k\Delta l_S)\right] dk, \\
&= \frac{\gamma P_0}{4} \exp\left[-\left(\frac{2\Delta l_S \sqrt{\ln 2}}{l_\omega}\right)^2\right] \\
&\quad \left[R_1 + R_M + 2\sqrt{R_1 R_M} \cos(2k_0 \Delta l_S)\right],
\end{aligned} \quad (117)$$

where the coherence length of the laser source is $$l_\omega = \frac{4\ln 2}{\Delta k} = \frac{2(\ln 2)\lambda_0^2}{\pi \Delta \lambda}, \quad (118)$$

$\lambda_0$ is the central wavelength of the low coherence laser source. From Equations (116) and (117), the Gaussian profile of the interference signals is obtained. For simplicity, the condition $\Delta l_P \cong \Delta l_S = \Delta l$ is assumed. Thus, $\Delta l_P - \Delta l_S \ll l_\omega$ is satisfied. The differential signal output generated by the differential amplifier (DA), which receives the first and second optical heterodyne electrical signal outputs from the first and second photo detectors (D1, D2), becomes $$\begin{aligned}
I_{diff} &= |I_P - I_S| \\
&\cong \left| \frac{\gamma P_0}{4} \exp\left[-\left(\frac{2\Delta l \sqrt{\ln 2}}{l_\omega}\right)^2\right] \right. \\
&\quad \left. \left\{(R_S - R_M) + 2\sqrt{R_1}\left[\sqrt{R_S} \cos(2k_0\Delta l_P) - \sqrt{R_M} \cos(2k_0\Delta l_S)\right]\right\} \right|
\end{aligned} \quad (119)$$

By considering only the AC part of $I_p$, $I_s$ and $I_{diff}$ in Equations (116), (117) and (119), $$I_P = \frac{\gamma P_0}{2} \exp\left[-\left(\frac{2\Delta l_P \sqrt{\ln 2}}{l_\omega}\right)^2\right] \left|\sqrt{R_1 R_S} \cos(2k_0 \Delta l_P)\right| \quad (120a)$$

$$I_S = \frac{\gamma P_0}{2} \exp\left[-\left(\frac{2\Delta l_S \sqrt{\ln 2}}{l_\omega}\right)^2\right] \left|\sqrt{R_1 R_M} \cos(2k_0 \Delta l_S)\right| \quad (120b)$$

$$I_{diff} \cong \frac{\gamma P_0 \sqrt{R_1}}{2} \exp\left[-\left(\frac{2\Delta l \sqrt{\ln 2}}{l_\omega}\right)^2\right] \left|\begin{array}{l}\sqrt{R_S} \cos(2k_0 \Delta l_P) - \\ \sqrt{R_M} \cos(2k_0 \Delta l_S)\end{array}\right| \quad (120c)$$

where $2k_0\Delta l_P = \omega_D t + \phi_P$ and $2k_0\Delta l_S = \omega_D t + 100_S$ are defined, and $\omega_D$ is the Doppler frequency shift from the modulation of the piezoelectric-supported mirror (PZT). $\phi_P$ and $\phi_S$ are the phase terms corresponding to path length from the first polarization beam splitter (PBSb) to the specimen (S) and the mirror (M), respectively. Therefore, $$\begin{aligned}
I_{diff} &\cong \frac{\gamma P_0 \sqrt{R_1}}{2} \exp\left[-\left(\frac{2\Delta l \sqrt{\ln 2}}{l_\omega}\right)^2\right] \left|\sqrt{R_S} \cos(\omega_D t + \phi_P) - \right. \\
&\quad \left. \sqrt{R_M} \cos(\omega_D t + \phi_S)\right| \\
&= \frac{\gamma P_0 \sqrt{R_1}}{2} \exp\left[-\left(\frac{2\Delta l \sqrt{\ln 2}}{l_\omega}\right)^2\right] \left|\sqrt{R_S} \cos(\omega_D t + \phi_P - \phi_S) - \right. \\
&\quad \left. \sqrt{R_M} \cos(\omega_D t)\right| \\
&= \frac{\gamma P_0 \sqrt{R_1}}{2} \exp\left[-\left(\frac{2\Delta l \sqrt{\ln 2}}{l_\omega}\right)^2\right] \left|\cos(\omega_D t)\right. \\
&\quad \left[\sqrt{R_S} \cos(\Delta\phi) - \sqrt{R_M}\right] + \sin(\omega_D t)\left[-\sqrt{R_S} \sin(\Delta\phi)\right] \Big| \\
&= \frac{\gamma P_0 \sqrt{R_1}}{2} \exp\left[-\left(\frac{2\Delta l \sqrt{\ln 2}}{l_\omega}\right)^2\right] \sqrt{R_S + R_M - 2\sqrt{R_S R_M} \cos(\Delta\phi)} \\
&\quad \cos(\omega_D t - \theta),
\end{aligned} \quad (121)$$

and $\Delta\phi = \phi_P - \phi_S$ is the differential-phase. During the derivation, a common phase, $\phi_S$, was shifted in both cosine terms in Equation (121) because the differential output signal from the differential amplifier (DA) in FIG. 2 is independent of the starting point of the optical heterodyne signals. Then $$\cos\theta = \frac{\sqrt{R_S} \cos(\Delta\phi) - \sqrt{R_M}}{\sqrt{R_S + R_M - 2\sqrt{R_S R_M} \cos(\Delta\phi)}}, \quad (122)$$

$$\sin\theta = \frac{-\sqrt{R_S} \sin(\Delta\phi)}{\sqrt{R_S + R_M - 2\sqrt{R_S R_M} \cos(\Delta\phi)}}. \quad (123)$$

The amplitudes of $I_p$, $I_s$ and $I_{diff}$ in Equations (116), (117) and (121) are simultaneously measured using the data acquisition unit 31, which is an analog-to-digital converter (ADC) in this embodiment:

$$I_P^M = \text{Max}\left\{\frac{\gamma P_0 \sqrt{R_1 R_S}}{2} \exp\left[-\left(\frac{2\Delta l \sqrt{\ln 2}}{l_\omega}\right)^2\right] \cos(2k_0 \Delta l_P)\right\}, \quad (124)$$

$$I_S^M = \text{Max}\left\{\frac{\gamma P_0 \sqrt{R_1 R_M}}{2} \exp\left[-\left(\frac{2\Delta l \sqrt{\ln 2}}{l_\omega}\right)^2\right] \cos(2k_0 \Delta l_S)\right\}, \quad (125)$$

-continued $$I_{diff}^M = \text{Max}\left\{\frac{\gamma P_0 \sqrt{R_1}}{2} \exp\left[-\left(\frac{2\Delta l \sqrt{\ln 2}}{l_\omega}\right)^2\right]\right.$$
$$\left.\sqrt{R_S + R_M - 2\sqrt{R_S R_M} \cos(\Delta\phi)} \cos(\omega_D t - \theta)\right\} \quad (126)$$

In Equation (126), the amplitude of the differential signal output of the differential amplifier (DA) is related to the differential-phase $\Delta\phi$, which varies with the optical path difference of the $P_2$ and $S_2$ waves. If the specimen (S) is a mirror surface, the surface height $\Delta h$ of the specimen (S) with reference to the mirror (M) can then be calculated by the computing unit 41 according to the following Equation (127)

$$\Delta h = \frac{1}{2} \cdot \frac{\lambda_0}{2\pi} \cdot \Delta\phi \quad (127)$$
$$= \frac{\lambda_0}{4\pi} \cos^{-1}\left[\frac{(I_S^M)^2 + (I_P^M)^2 - (I_{diff}^M)^2}{2I_S^M I_P^M}\right].$$

However, there might be a residual phase bias generated by optical components or a fixed optical path difference between two beams from the first polarization beam splitter (PBSb) to the mirror (M) and the specimen (S) in FIG. 2. This results in a constant surface height $\Delta h_0$ in the measurement. Accordingly, the result from Equation (127) is modified to be $$\Delta h = \frac{\lambda_0}{4\pi} \cos^{-1}\left[\frac{(I_S^M)^2 + (I_P^M)^2 - (I_{diff}^M)^2}{2I_S^M I_P^M}\right] - \Delta h_0 \quad (128)$$

It has thus been shown that the differential-phase interferometric system of the second preferred embodiment is suitable for highly sensitive surface profile detection and permits measurement of surface profile dynamically due to its fast response.

While the phase-modulating mirror unit is illustrated as a piezoelectric-supported mirror (PZT) in this embodiment, it should be apparent to those skilled in the art that the phase-modulating mirror unit could include an immobile mirror working in conjunction with an electro-optic phase modulator or an acousto-optic phase modulator in other embodiments of this invention.

Figure 3:
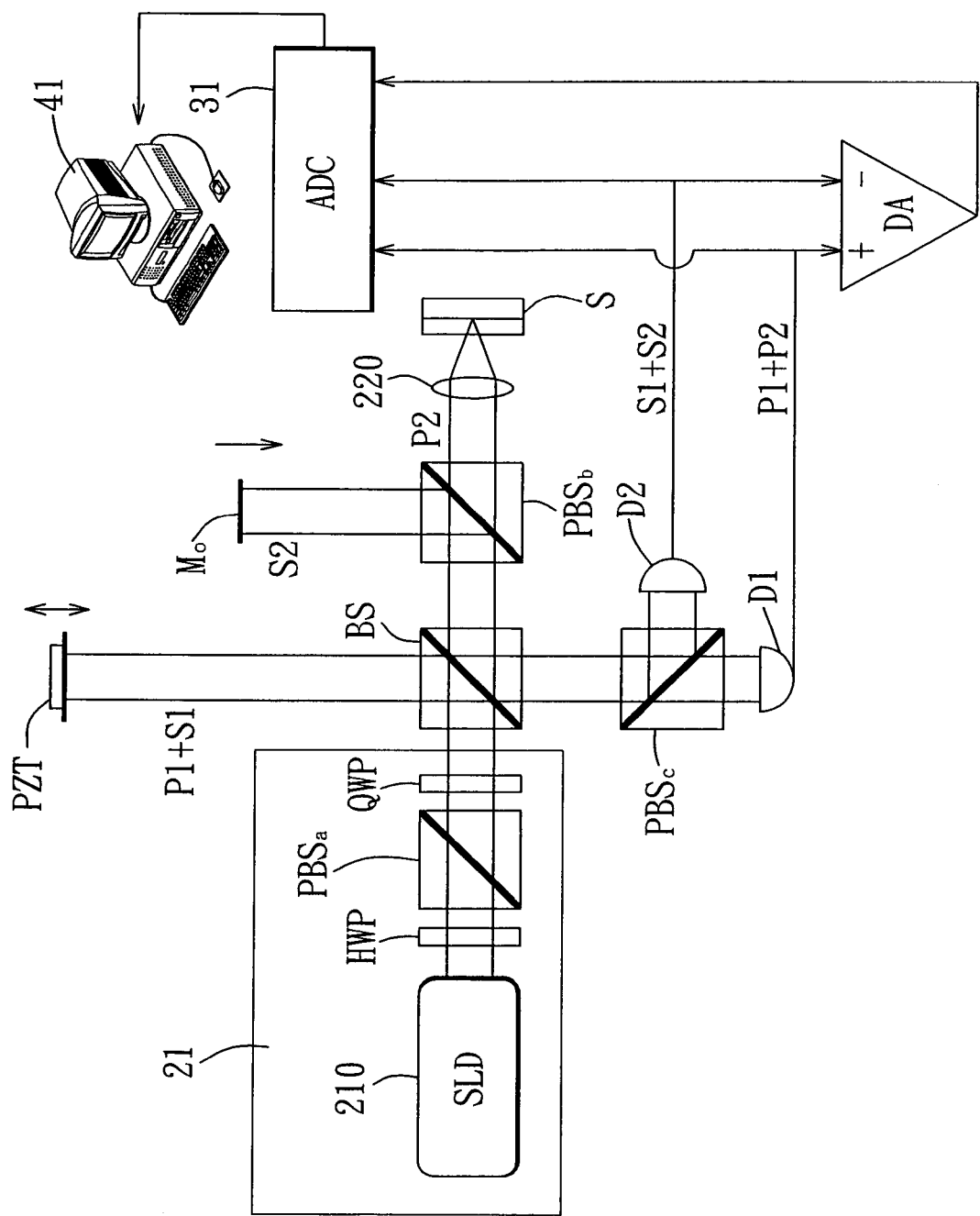
FIG. 3 is a block diagram of a third preferred embodiment of a differential-phase interferometric system according to the present invention.

Application of the differential-phase interferometric system of this invention could be extended to differential-phase optical coherence tomography (DP-OCT), differential-phase optical Doppler tomography (DP-ODT), differential-phase polarization sensitive optical coherence tomography (DP-PS-OCT) for birefringent phase measurement, and differential-phase contrast optical coherence microscopy (DP-OCM) for biological object imaging. FIG. 3 illustrates the third preferred embodiment of a differential-phase interferometric system according to the present invention, which is a modification of the second preferred embodiment and which is suitable for optical coherence tomography (OCT) applications. Unlike the second preferred embodiment, the $S_2$ wave is reflected by a scanning mirror ($M_O$), whereas the $P_2$ wave is passed through a lens 220 and is focused on and reflected by an imaging plane in the specimen (S). Since the operation of the third preferred embodiment is analogous to that of the second preferred embodiment, further details of the same are omitted herein for the sake of brevity.

If a broadband swept laser source is employed in the light source module 21 of the polarized heterodyne interferometer instead of the broadband SLD 210, the differential-phase interferometric system of the third preferred embodiment could have applications in Fourier-domain DP-OCT, Fourier-domain DP-PS-OCT, Fourier-domain DP-ODT, and Fourier-domain DP-OCM.

It has thus been shown that, unlike the phase demodulator and the phase difference detector disclosed in U.S. Pat. No. 7,006,562, the differential-phase interferometric system of this invention does away with the requirement of amplitude adjustment of test and reference signals. Accordingly, high response speed and high detection speed are possible, and the differential-phase interferometric system of this invention can be configured for a wide variety of applications.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A differential-phase interferometric system for measuring a specimen, comprising:
   a polarized heterodyne interferometer for generating a reference beam that travels along a reference channel and that includes two mutually orthogonal first and second linear polarized waves, and a signal beam that travels along a signal channel and that includes two mutually orthogonal first and second linear polarized waves, the reference and signal beams having a beat frequency therebetween, the signal beam being directed to the specimen and containing measured information of the specimen, said polarized heterodyne interferometer further generating a first optical heterodyne electrical signal output corresponding to the first linear polarized waves of the reference and signal beams, and a second optical heterodyne electrical signal output corresponding to the second linear polarized waves of the reference and signal beams;
   a differential amplifier receiving the first and second optical heterodyne electrical signal outputs from said polarized heterodyne interferometer, and generating a differential signal output therefrom;
   a data acquisition unit receiving the first and second optical heterodyne electrical signal outputs from said polarized heterodyne interferometer and the differential signal output from said differential amplifier, and measuring amplitudes of the first and second optical heterodyne electrical signal outputs and the differential signal output; and
   a computing unit for computing the amplitudes measured by said data acquisition unit to determine at least one parameter corresponding to the measured information of the specimen.

2. The differential-phase interferometric system as claimed in claim 1, wherein said data acquisition unit employs envelope detection to detect amplitudes of the first and second electrical signal outputs and the differential signal output.

3. The differential-phase interferometric system as claimed in claim 1, wherein said computing unit determines an ellipsometric parameter of the specimen.

4. The differential-phase interferometric system as claimed in claim 3, wherein said polarized heterodyne interferometer includes:

a coherent light source for providing polarized light;

a first beam splitter for splitting the polarized light from the coherent light source into the reference beam and the signal beam;

first and second frequency modulators for processing the reference beam and the signal beam, respectively, such that the reference beam and the signal beam have the beat frequency therebetween;

first and second polarizers for processing the reference beam and the signal beam, respectively, such that each of the reference beam and the signal beam has the mutually orthogonal first and second linear polarized waves;

a second beam splitter for combining the reference and signal beams after the signal beam has passed through the specimen;

a polarization beam splitter for separating an output beam from said second beam splitter into mutually orthogonal linear-polarized first and second optical signals, the first optical signal corresponding to the first linear polarized waves of the signal and reference beams, the second optical signal corresponding to the second linear polarized waves of the signal and reference beams; and first and second photo detectors for detecting the first and second optical signals, respectively, so as to generate the first and second optical heterodyne electrical signal outputs, respectively.

5. The differential-phase interferometric system as claimed in claim 4, wherein said polarized heterodyne interferometer further includes first and second bandpass filters, each of which processes a respective one of the first and second optical heterodyne electrical signal outputs and has a center frequency at the beat frequency of the first and second optical heterodyne electrical signal outputs.

6. The differential-phase interferometric system as claimed in claim 4, further comprising a compensator disposed between said second polarizer and the specimen to compensate for DC phase bias.

7. The differential-phase interferometric system as claimed in claim 1, wherein said computing unit determines a surface profile of the specimen.

8. The differential-phase interferometric system as claimed in claim 7, wherein said polarized heterodyne interferometer includes:

a light source module for generating a circularly polarized output beam;

a beam splitter for splitting the circularly polarized output beam into the reference beam and the signal beam;

a phase-modulating mirror unit modulated at a predetermined frequency and reflecting the reference beam;

a mirror;

a first polarization beam splitter for splitting the signal beam into the first and second linear polarized waves, wherein one of the first and second linear polarized waves of the signal beam is reflected by said mirror and the other one of the first and second linear polarized waves of the signal beam is reflected by the specimen;

said beam splitter combining the reference beam reflected by said phase-modulating mirror unit and the first and second linear polarized waves of the signal beam reflected by said mirror and the specimen;

a second polarization beam splitter for separating an output beam from said beam splitter into mutually orthogonal linear-polarized first and second optical signals, the first optical signal corresponding to the first linear polarized waves of the signal and reference beams, the second optical signal corresponding to the second linear polarized waves of the signal and reference beams; and first and second photo detectors for detecting the first and second optical signals, respectively, so as to generate the first and second optical heterodyne electrical signal outputs, respectively.

9. The differential-phase interferometric system as claimed in claim 8, wherein said polarized heterodyne interferometer further includes an objective lens for focusing the other one of the first and second linear polarized waves of the signal beam onto the specimen.

10. The differential-phase interferometric system as claimed in claim 8, wherein said light source module includes a broadband super luminescent diode.

11. The differential-phase interferometric system as claimed in claim 1, wherein said polarized heterodyne interferometer includes:

a light source module for generating a circularly polarized output beam;

a beam splitter for splitting the circularly polarized output beam into the reference beam and the signal beam;

a phase-modulating mirror unit modulated at a predetermined frequency and reflecting the reference beam;

a scanning mirror;

a first polarization beam splitter for splitting the signal beam into the first and second linear polarized waves, wherein one of the first and second linear polarized waves of the signal beam is reflected by said scanning mirror and the other one of the first and second linear polarized waves of the signal beam is reflected by the specimen;

said beam splitter combining the reference beam reflected by said phase-modulating mirror unit and the first and second linear polarized waves of the signal beam reflected by said scanning mirror and the specimen;

a second polarization beam splitter for separating an output beam from said beam splitter into mutually orthogonal linear-polarized first and second optical signals, the first optical signal corresponding to the first linear polarized waves of the signal and reference beams, the second optical signal corresponding to the second linear polarized waves of the signal and reference beams; and first and second photo detectors for detecting the first and second optical signals, respectively, so as to generate the first and second optical heterodyne electrical signal outputs, respectively.

12. The differential-phase interferometric system as claimed in claim 11, wherein said polarized heterodyne interferometer further includes a lens through which the other one of the first and second linear polarized waves of the signal beam passes to reach the specimen.

13. The differential-phase interferometric system as claimed in claim 11, wherein said light source module includes one of a broadband super luminescent diode and a broadband swept laser source.

* * * * *